Oct. 5, 1954     L. B. FORMAN     2,690,824
BRAKE HOLDING DEVICE
Filed April 23, 1949
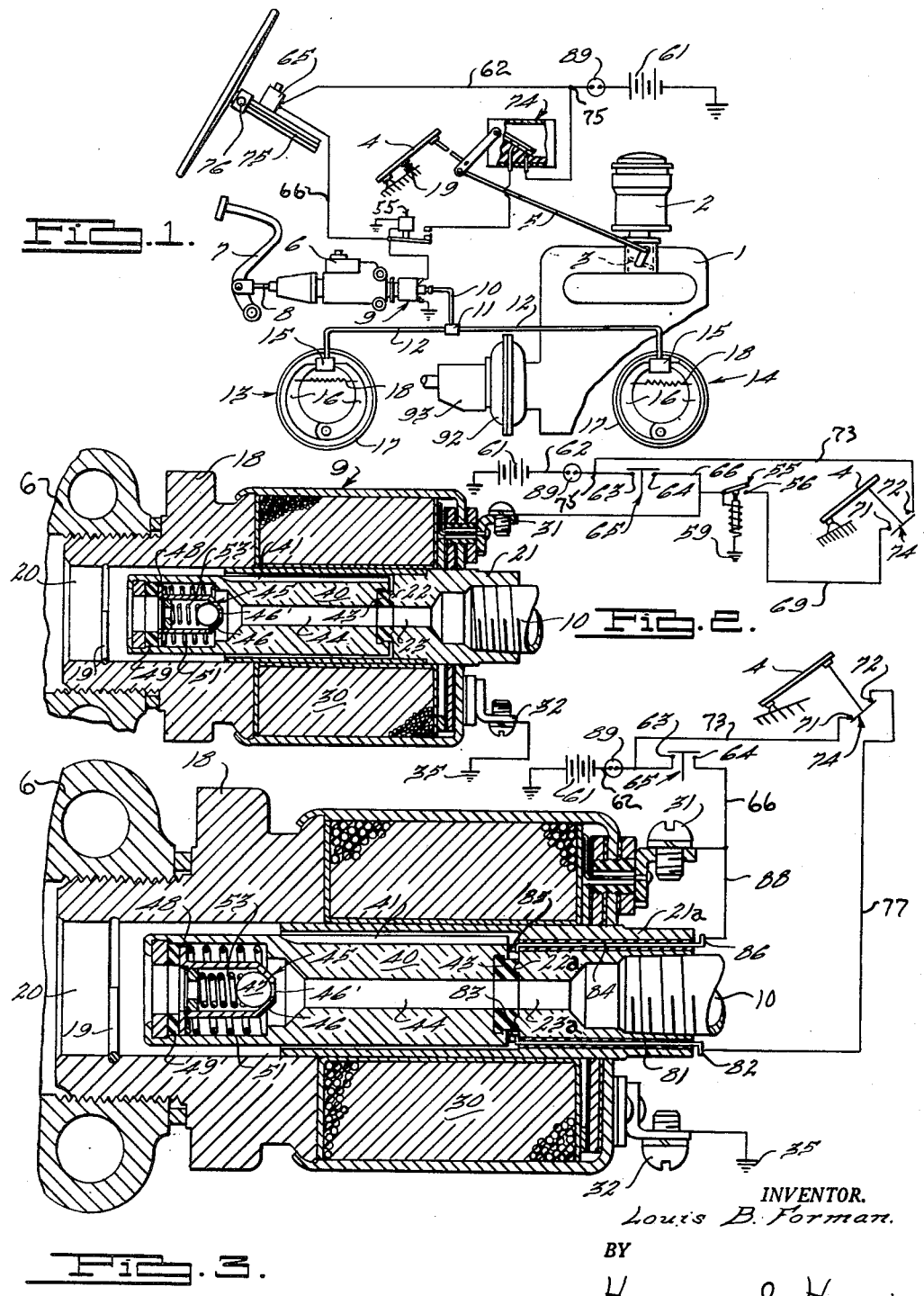
INVENTOR.
Louis B. Forman.
BY
Harness and Harris
ATTORNEYS.

Patented Oct. 5, 1954

2,690,824

UNITED STATES PATENT OFFICE 2,690,824

BRAKE HOLDING DEVICE

Louis B. Forman, Detroit, Mich., assignor to Chrysler Corporation, Highland Park, Mich., a corporation of Delaware Application April 23, 1949, Serial No. 89,221

1 Claim. (Cl. 192—3)

This invention relates to a control system particularly adapted for use as a brake control means to provide a no-creep device for use on motor vehicles equipped with a fluid drive transmitting mechanism and a system of fluid pressure operated brakes. This invention is an improvement on the brake control systems shown in the application of Robert L. Mayrath, Serial No. 786,277, filed November 15, 1947, now U. S. Patent 2,522,835, and in my co-pending application Serial No. 793,290, filed December 22, 1947, now U. S. Patent 2,574,821.

In the past it has been the practice to provide no-creep devices that are automatically brought into operation every time the vehicle is brought to a stop with the engine idling and the power transmission unit set for the transmission of drive. Such systems have been satisfactory, but they have also been relatively expensive to install and operate due to the fact that they usually require sensitive speed responsive governor mechanisms, and the extremely frequent activation of the no-creep device at every vehicle stop requires a very rugged type of installation in order to withstand the frequent cycles of activation. The two above-identified applications disclose means whereby the conventional speed responsive governor means may be eliminated from the control system for this type of no-creep device. This application provides means whereby activation of the no-creep device is reduced to a minimum, the brake system placed under the complete control of the vehicle operator, and certain dangerous conditions associated with automatically operated no-creep devices eliminated.

It is a primary object of this invention to provide a brake holding device that is manually activated by the vehicle driver and automatically deactivated on the initiation of drive by the vehicle operator.

It is a further object of this invention to provide a no-creep device that is placed under the complete control of the vehicle operator so that it may be brought into operation only when needed and thus unnecessary activation and wear of the device is eliminated.

It is an additional object of this invention to provide a control system for a no-creep device that will prevent the brakes from being automatically set when the road conditions are such that setting of the brakes might be dangerous as when the road is wet, icy, or snow-covered.

Other objects and advantages of my invention will become apparent from the following detailed description of my invention when considered in connection with the accompanying drawings, in which:

Fig. 1 is a schematic view of the pertinent portions of a motor vehicle having my improved brake holding device associated with the vehicle fluid pressure braking system;

Fig. 2 is a schematic wiring diagram for the brake holding device shown in Fig. 1, the valve unit of this system being shown in cross sectional elevation; and Fig. 3 is a schematic wiring diagram of a modified form of my invention wherein the valve unit includes switch contacts to control operation of the brake holding device, the valve unit being shown in cross sectional elevation.

Referring to the drawings in detail, 1 indicates a vehicle engine having the usual carburetor 2 controlled by a throttle valve 3 to permit variation in the amount of fuel fed to the engine. The valve 3 is actuated by an accelerator pedal 4 pivotally mounted in the vehicle driver's compartment and connected to the valve 3 by a linkage rod 5. The engine drives the wheels of the vehicle (not shown) through the usual change speed transmission gearing 93, clutch, and/or fluid coupling 92, propeller shaft and differential gearing (not shown), as is well known in the art. A fluid coupling or similar type of slip-drive device 92 has been indicated schematically in Fig. 1, between the engine 1 and the change speed transmission 93.

The braking system of the vehicle is schematically shown in Fig. 1, and comprises a brake master cylinder 6, the piston of which (not shown) is actuated by the pivotally mounted brake pedal 7 through a piston rod 8, said pedal 7 being mounted in the vehicle driver's compartment. Fitted to the outlet end of the brake master cylinder 6 is the solenoid actuated control valve unit 9 of this brake holding device. The brake lines include a fluid pressure conduit 10 connected to the outlet end of the valve unit 9 and to a fitting 11 from which supply conduits 12 branch out to supply pressure fluid to the wheel brake units 13 and 14 (only two of which are shown). Each of these wheel brake units comprises an actuating fluid motor or wheel cylinder 15 for the associated brake shoes 16 whereby the shoes 16 may be moved into and out of braking engagement with the associated brake drums 17 carried by vehicle wheels (not shown). Tension springs 18 normally return the brake shoes to disengaged positions.

The brake holding valve unit 9, interposed between the brake master cylinder 6 and supply conduit 10, provides means whereby pressure fluid can be trapped in the wheel cylinders 15 of the wheel braking units to maintain the brakes applied after braking pressure has been removed from the brake pedal and the pedal has returned to its released position. The specific valve unit shown in Figs. 1 and 2 is described and claimed in the application of Donald A. Baird, Serial No. 787,957, filed November 25, 1947. It will be noted that the valve unit 9 is directly connected to the outlet end of the master cylinder 6 and to the conduit 10 by means of simple, inexpensive, leak-proof, screw connections. Such connections do not require packing glands or the like and therefore provide a closed brake system that is safe and permanent.

As clearly shown in detail in Fig. 2, valve unit 9 comprises a substantially cylindrical casing member 18 about which is mounted an electromagnetic solenoid coil 30. Casing 18 is pierced by a bore 20 and mounted in the bore 20 of the casing member 18 is the electromagnetically responsive plunger control valve member 40. Plunger member 40 constitutes an armature which is adapted to reciprocate in the bore 20 of the casing 18. Snap ring 19 and casing end member 21 limit the reciprocatory movement of the plunger member 40 in the bore 20 of the casing member 18. Casing end member 21 is provided with a raised lip portion 22 which constitutes a valve seat adapted to be engaged by the resiliently faced end portion 43 of the plunger control valve 40 when valve member 40 is moved against the end member 21. Plunger valve member 40 is of such material that it is responsive to energization of the solenoid 30. Energization of solenoid 30 moves plunger valve 40 towards end member 21 and lip 22 seals against the resiliently faced portion 43 of plunger valve 40. Plunger valve 40 is provided with a longitudinally extending by-pass channel 41 adapted to provide a passageway for the flow of pressure fluid from master cylinder 6 to conduit 10 when the plunger valve 40 is not being held against the lip 22 of the end member 21. When the valve member 40 does not seal the passageway to the outlet port 23 in end member 21 then the by-pass channel 41 provides a passageway which allows pressure fluid to pass directly from the master cylinder 6 to the conduit 10 without going through the combination by-pass and relief valve assembly 45.

Valve assembly 45 is mounted in the enlarged end of the bore 44 extending through the plunger valve member 40. Plunger valve member 40 is provided with the longitudinally extending bore 44 so as to afford a passageway for the flow of pressure fluid between the master cylinder 6 and the wheel brake cylinders 15 when the portion 43 of plunger valve 40 is being held by solenoid 30 in seated engagement with the lip 22 of the end member 21 thereby sealing off passageway 41. The valve assembly 45 comprises a cup-shaped valve seat member 46, having an orifice 46' therethrough, the orifice being adapted to be normally closed by the spring-pressed, ball-type, relief valve 47. The cup-shaped valve seat member 46 has a radially extending flange portion 48 which is adapted to be urged, by spring 51, against the resiliently faced valve seat portion 49 formed on plunger valve member 40. The spring-pressed flange 48 and the seat 49 constitute a by-pass valve for plunger control valve 40 when the control valve 40 is seated on the lip 22 of end member 21.

When the solenoid 30 is de-energized there are no electromagnetic forces which tend to force the plunger valve 40 against the sealing lip 22 to close off passageway 41. Accordingly, pressure fluid may flow to the wheel cylinders from the master cylinder 6 through the by-pass channel 41 and the open control valve port 23. If during application of the brakes the pressure fluid from the master cylinder should force the plunger member 40 against the sealing lip 22 pressure fluid can still pass to the wheel cylinders 15 through the by-pass valve 48, 49 of the valve assembly 45 for continued application of braking pressure after passageway 41 is closed by plunger valve 40 will raise the flange portion 48 of the member 46 off the valve seat 49, against the pressure exerted by the spring 51, and then pressure fluid passes through the plunger bore 44 and port 23 to the brake lines 12. Whenever solenoid 30 is energized electromagnetic forces urge the magnetically responsive plunger valve member 40 against the lip 22 and then with the by-pass channel 41 closed the pressure fluid must pass through the by-pass valve 48, 49 of the valve assembly 45 of the plunger valve 40 in the manner already set forth. If the plunger valve 40 traps pressure fluid in the brake lines 12 having a pressure in excess of the pressure exerted by the spring 53 on the ball-type, relief valve 47, then relief valve 47 is backed off its seat 46' until the pressure trapped in the brake lines 12 has been reduced to the value determined by spring 53. This value will be only that necessary for no-creep brake holding purposes. It has been found that approximately 115 pounds per sq. in. pressure in the brake lines is adequate to prevent creep of a motor vehicle equipped with a fluid drive transmitting mechanism. A trapped braking pressure of 115 pounds will release rapidly enough in starting up to prevent a "freight train" start yet will positively prevent creep. As previously brought out the by-pass valve 48, 49 of the combination valve assembly 45 also provides means for raising the trapped brake line pressure to the relief valve pressure after the valve 40 has been closed due to energization of the solenoid coil 30.

The circuit for controlling operation of the no-creep device shown in Fig. 1 is diagrammatically represented in Fig. 2. The grounded battery 61 is connected by conductor 62 to one contact 63 of a manually operated switch 65. Switch 65 is preferably mounted on the steering post 75, as shown, or on the gear shift lever 76, so that it is within convenient reach of the vehicle operator. The other contact 64 of switch 65 is connected by conductor 66 to one contact 31 of the valve unit solenoid 30. The other contact 32 of valve unit solenoid 30 is connected to ground at 35. Connected in parallel with the valve unit solenoid 30 is the relay operated switch 55. Relay 55 is connected to ground at 59. Energization of relay 55 will close switch contact 56 and conductor 69 will connect solenoid 30 to the contact 71 of the accelerator pedal controlled switch 74. The other contact 72 of accelerator controlled switch 74 is connected by conductor 73 to the conductor 62 at a point 75 between the battery 61 and the manually controlled switch 65.

Operation of the no-creep device shown in Figs. 1 and 2 is as follows: After bringing the vehicle to a stop in the normal manner with the brake pedal 7 applied and the accelerator pedal 4 released, the vehicle operator merely closes the manually operated switch 65 while the brakes are applied. Closing switch 65 completes circuits that energize both the valve unit solenoid 30 and the relay 55. Closing the circuit through the switch 65 and the valve unit solenoid 30 moves the valve unit plunger member 40 against the valve seat 22 and traps the existing braking pressure in the wheel cylinders 15. As the relay 55 is also closed by closing switch 65 it is obvious that a parallel circuit for the energization of valve unit solenoid 30 is also available provided accelerator pedal controlled switch 74 is also closed at this time. The return spring 19 associated with the accelerator pedal 4 normally closes switch 74 whenever pressure is removed from the pedal 4. Consequently, during any normal stop the accelerator pedal 4 will be released and switch 74 will be closed. Accordingly, if switch 65 is closed at this time then a second circuit is available to energize the valve unit solenoid 30 and retain the brakes applied after braking pressure has been removed from the brake pedal 7 and after the switch 65 has been released or opened. This second circuit is from battery 61 through conductors 62 and 73 to closed switch 74 and then through conductor 69 to closed relay 55, then to contact 31 of the solenoid 30 and to ground at 35. Once this second circuit is established then the opening of manually operated switch 65 has no effect on the valve unit control system for both relay 55 and solenoid 30 will remain energized through this second circuit. Consequently, the control valve 30 will retain the brakes applied with whatever braking pressure is trapped in the system. This trapped pressure can be increased to approximately 115 lbs. per sq. in. by pumping the brake pedal 7 and unseating by-pass valve 48, 49, but the relief bleed-back valve mechanism 47 will prevent trapping of a greater pressure than 115 lbs. per sq. in. in the braking system. The control valve unit 9 retains the brakes applied as long as the accelerator pedal 4 is in released position but as soon as the pedal 4 is depressed to initiate drive through the power transmitting train then the circuits for the valve unit solenoid 30 and the relay 55 are broken and the brakes released. The control circuits for solenoid 30 and relay 55 cannot be reestablished without first closing the manually operated switch 65. It is thought to be obvious from the foregoing description of the control circuit shown in Figs. 1 and 2 that the no-creep valve unit 9 will be activated only when the vehicle operator desires the assistance of this device and activates the valve unit 9 through manual switch 65. This prevents unnecessary wear of the no-creep device and prevents an automatic setting of the brakes as the vehicle is being brought to a stop. It has been found that with no-creep systems that are automatically set at every stop of the vehicle, there is a tendency for the brakes to be locked by the no-creep device when the vehicle speed has been reduced to 3 or 4 miles per hour and if the road is slippery during such braking action then dangerous lurch and skid conditions are set up. Applicant's control system completely eliminates such a danger and gives the vehicle operator complete control of the no-creep device. The momentary closing of the switch 65 while the vehicle is being brought to a stop is all that is required to activate this no-creep control system which thereafter functions automatically. It will be noted that this system is extremely simple to manufacture and install and that it can easily be added to any conventional pressure fluid operated brake system or the like. Governor mechanisms are not required nor are atmospheric or manifold pressures relied upon to operate the device. A minimum of valve unit wear is involved and only a very slight drain is placed on the vehicle electrical system.

The modified form of the invention shown in Fig. 3 differs from that shown in Figs. 1 and 2 in that the relay 55 of the Fig. 2 system is eliminated from the control system shown in Fig. 3 and substituted therefor are a set of valve unit switch contacts 81—86, mounted in the valve unit end member 21a. This Fig. 3 arrangement functions in substantially the same manner as the control system shown in Figs. 1 and 2 but the cost of the Fig. 3 system is reduced and the installation and maintenance of this system simplified. Corresponding parts of the systems shown in Figs. 2 and 3 bear the same reference numerals. The end member 21a of the Fig. 3 form of the invention is similar to end member 21 of the Fig. 2 form in that end member 21a has a valve seat 22a and a valve outlet port 23a. In addition end member 21a has insulated conductor elements 81 and 84 embedded in and extending longitudinally through its body portion. Conductor 81 has the contacts 82 and 83 at its opposite ends and conductor 84 has the contacts 85 and 86 at its opposite ends. The contacts 83 and 85 at the inner ends of the conductors 81 and 84 respectively are resilient spring strips that are engaged by the operative end of metallic plunger valve 40 when the valve member 40 is urged against the valve seat 22a as a result of energization of solenoid 30. By having the contacts 83 and 85 made from resilient spring strips, or the like, these contacts may be flexed toward end member 21a during movement of valve member 40 toward end member 21a and thus the contacts 83, 85 will not interfere with the seating of valve portion 43 on valve seat 22a. A conductor 77 connects contact 82 of conductor 81 to the contact 72 of the accelerator controlled switch 74. A conductor 88 connects contact 86 of conductor 84 to the contact 31 of the solenoid 30.

Operation of the control system shown in Fig. 3 is substantially identical to that described with regard to the control system shown in Fig. 2. In the Fig. 3 form of the invention the manually operated switch 65 is closed when the vehicle is brought to a stop and while the brakes are applied. Closing switch 65 completes a circuit from battery 61 through conductor 62, switch 65, conductor 66, contact 31, solenoid 30, and contact 32 to ground at 35. This circuit energizes the solenoid 30 and causes plunger valve member 40 to be moved against valve end member 21a so as to close off valve outlet port 23a and trap the braking pressure fluid in the wheel cylinders 15. If at the time switch 65 is closed and solenoid 30 is energized, the accelerator pedal controlled switch 74 is closed, as would normally be the case when coming to a stop, then a second circuit is completed to retain the brakes applied after switch 65 is opened and the braking pressure on the brake pedal 7 is relieved. It will be noted that when plunger valve member 40 is moved against the valve end member 21a that the contacts 83 and 85 are connected by the metallic plunger valve member 40 so as to establish a second circuit for the energization of solenoid 30. This second circuit is from battery 61 through conductors 62 and 73 to closed switch 74 and then through conductor 77 to contact 82. Contact 82 is connected to contact 86 through conductor 81, contact 83, valve plunger 40, contact 85, and conductor 84. Contact 86 is connected to the solenoid contact 31 by the conductor 88. This second circuit is grounded through the solenoid 30 at 35. Thus the movement of the plunger valve core 40 to closed valve position by operation of switch 65 establishes a second circuit to retain the solenoid 30 energized after opening of switch 65 provided the accelerator controlled switch 74 is closed during the energization of solenoid 30. As was the case with the circuit shown in Fig. 2, this Fig. 3 circuit provides a means for activating the no-creep circuit by a mere closing of the switch 65. At all other times the braking system functions in its normal manner. The brakes are never set except when the vehicle operator desires the assistance of the no-creep device and release of th no-creep device occurs automatically with depression of the foot accelerator 4 to initiate drive.

While this brake holding device has been described as constituting a no-creep device, it is thought to be obvious that this device will also function as a hill-holder for it will lock the brakes in applied position whenever the vehicle is brought to rest on a hill if switch 65 of the control circuit for the valve unit 9 is activated.

While no ignition switch has been described as associated with the control systems shown in Fig. 2 and Fig. 3, it is obvious that an ignition control switch, such as switch 89, would be included in the system somewhere between the battery 61 and the point 75 in these control circuits so that the brake holding device would be operative only while the ignition system is turned on. The ignition switch 89 is a common and necessary part of every motor vehicle ignition system and its operation has no unobvious effect on the applicant's brake holding device. In place of the accelerator pedal controlled switch 74, it is thought to be obvious that a manifold vacuum controlled switch, such as that shown in my co-pending application Serial No. 793,290, now Patent No. 2,574,821 could be substituted for the switch 74 and the operation of the control circuits herein disclosed would be substantially the same as hereinabove described. A manifold pressure controlled switch would be directly controlled by the accelerator pedal so this substitution would merely involve a substitution of mechanical equivalents.

I claim:

In an automotive vehicle having an engine driven power transmission unit including a slip-drive power transmitting coupling, controls therefor shiftable to drive transmitting and no-drive positions, and vehicle brake controlling and engine accelerator pedals, a pressure fluid operated braking system including vehicle wheel brakes, braking system apparatus operable by said brake pedal for transmitting pressurized fluid to and causing the application of said wheel brakes, valve means in said brake system adapted to be closed to trap pressurized fluid in said brakes for retaining said brakes applied after said brake pedal has been released, a source of electrical energy, driver controlled electrically energized means to close said valve means, and a control system for said electrically energized means connected to said source of electrical energy comprising a first electrical circuit with a driver operable control switch to effect energization of said electrically energized means to close said valve means, a second electrical circuit arranged in parallel with said first circuit and including a first switch, automatically closed as a result of energization of said first circuit, and a second accelerator pedal controlled switch, that is closed in accelerator released position, connected in series with said first automatically operated switch, said second circuit being arranged to be energized by closing of said driver operable switch during accelerator release and while said transmission controls are in drive transmitting positions to provide means to retain said electrically energized means energized and said valve means closed after said first circuit has become deenergized by opening of said driver operable switch, said second circuit controlling deenergization of said electrically energized means through opening of said second accelerator controlled switch.

References Cited in the file of this patent

UNITED STATES PATENTS

| Number | Name | Date |
|---|---|---|
| 2,262,842 | Goepfrich | Nov. 18, 1941 |
| 2,270,002 | Glick | Jan. 13, 1942 |
| 2,272,320 | Freeman | Feb. 10, 1942 |
| 2,287,562 | Pennington | June 23, 1942 |
| 2,297,076 | Sacks | Sept. 29, 1942 |
| 2,345,280 | Morgan | Mar. 28, 1944 |
| 2,391,017 | Groutkowski | Dec. 18, 1945 |
| 2,478,884 | Wisely | Aug. 9, 1949 |
| 2,489,929 | Raybould | Nov. 29, 1949 |